(12) United States Patent
Estipona

(10) Patent No.: US 6,928,624 B1
(45) Date of Patent: Aug. 9, 2005

(54) METHOD AND APPARATUS TO DISPLAY VIDEO

(75) Inventor: Jim B. Estipona, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/519,136

(22) Filed: Mar. 6, 2000

(51) Int. Cl.⁷ .............................................. G06F 3/00
(52) U.S. Cl. ...................... 715/790; 715/781; 715/797
(58) Field of Search ............................. 345/784, 797, 345/759, 758, 790, 781; 703/756, 972, 638; 715/700, 719, 759, 768, 781, 784, 788, 790, 715/792, 794, 797, 804

(56) References Cited

U.S. PATENT DOCUMENTS

| | | | |
|---|---|---|---|
| 5,265,202 A * | 11/1993 | Krueger et al. ............. 345/158 |
| 5,590,265 A * | 12/1996 | Nakazawa ................... 345/781 |
| 6,348,953 B1 * | 2/2002 | Rybczynski .................. 348/584 |
| 6,384,840 B1 * | 5/2002 | Frank et al. ................. 345/634 |
| 6,411,047 B1 * | 6/2002 | Okazaki et al. ............. 315/312 |

OTHER PUBLICATIONS

"Movable Window (Screendump)", Microsoft Windows NT, Copyright 1985-96.*

* cited by examiner

*Primary Examiner*—X. L. Bautista
(74) *Attorney, Agent, or Firm*—Blayne D. Green

(57) ABSTRACT

A method includes creating a first window to receive video which at least partially overlaps a second window on a region of overlap of the display. Pixels of the first window are set to a chroma color. Background pixels of the second window in the region of overlap are also set to the chroma color, The second window is configured to draw after the first window.

15 Claims, 3 Drawing Sheets

METHOD AND APPARATUS TO DISPLAY VIDEO

BACKGROUND

1. Field

The patent relates to the field of displaying video in a computer system.

2. Background Information

Digital video comprises a sequence of digital images. It is increasingly common to display (e.g. render) digital video in computer systems. A computer system is any device comprising a processor and a memory to store instructions and data to be supplied to the processor. Typically, the processor and memory are coupled by way of one or more buses. A collection of instructions e.g. software, may be executed to convert the bits of the digital video to signals to a display device, e.g. to render the video. Examples of display devices are monitors and flat screens, to name just a few. Many other types of display devices are well known in the art.

Software may generate a windowed interface on the display device. The windowed interface may include windows with elements such as borders, title bars, buttons, sliders, and icons, to name just a few of the possibilities. Versions of the Microsoft™ Windows™ operating system, a product of Microsoft corporation, are examples of programs which produce windowed interfaces. Window elements are typically displayed on the "foreground" of a window; areas of the window in which display elements are not present are referred to as the "background" of the window. Rendering video on windowed interfaces is complicated by the need to coordinate the rendering of the video with the position and operation of windows and elements of the windows.

Existing techniques for rendering video on computer system displays may obscure or interfere with the operation of elements of the windowed interface. There is a continuing need for a manner of rendering video in the "background" of a window so that it does not interfere with the display or operation of windows.

SUMMARY

In one aspect, a method includes creating a first window to receive video which at least partially overlaps a second window on a region of overlap of the display. Pixels of the first window are set to a chroma color. Background pixels of the second window in the region of overlap are also set to the chroma color. The second window is configured to draw after the first window.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

Figure 1:
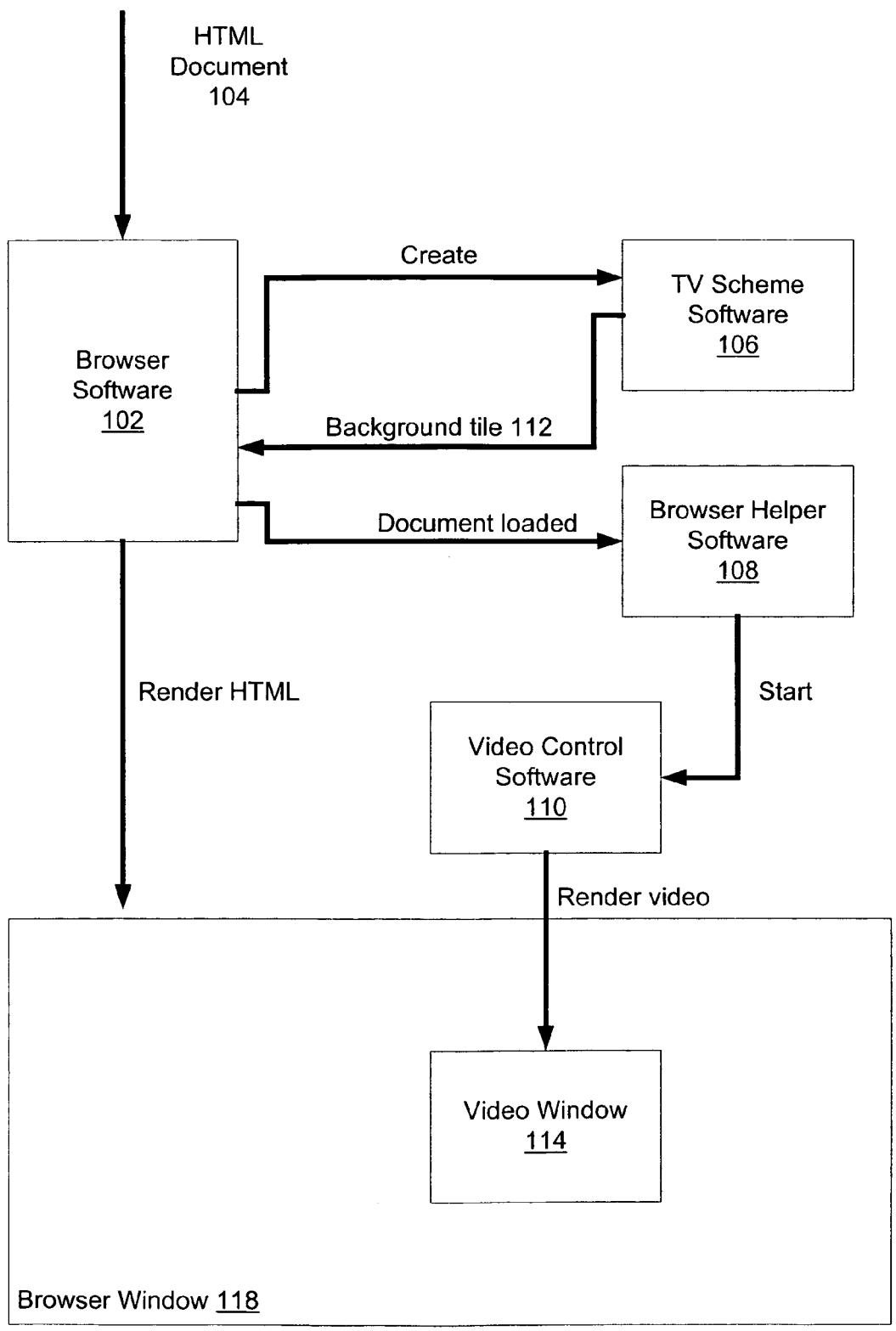
FIG. 1 shows a method embodiment in accordance with the present invention.

FIG. 1 shows a method embodiment 100 in accordance with the present invention. A Hypertext Markup Language (HTML) document 104 is received by browser software 102. In one embodiment, the HTML document 104 comprises a tag comprising a Uniform Resource Locator (URL) identifying a TV "scheme" (also referred to as a TV protocol) such as:

<BODY background="tv:">
</BODY>

In one embodiment the source of the video to render for a TV scheme is pre-configured, such that it is not necessary to identify a domain name, path, or filename in the URL. Of course, other embodiments could fully or partially specify the video source in the URL.

The tag may apply to the background of the entire document 104 or to an element of the document 104 such as a cell in a table. Browser software 102 creates software 106 and receives background tile 112 from software 106. Browser 102 may be configured to create software 106 when the "TV scheme" is encountered within a document 104. Software 106 may be referred to as a "scheme handler", "protocol handler", or more specifically, a "TV scheme handler". Manners of creating and configuring scheme handlers for browsers, such as the Microsoft Internet Explorer™ or the Netscape™ Navigator™ are well known in the art. Background tile 112 comprises a sequence of bits to duplicate across the background area of the element comprising the TV scheme. Background tile 112 may comprise a solid color, known as the chroma-key color for the video. Background tile 112 may be applied to areas of the browser window 118 to which video is to be rendered. Browser software 102 parses HTML document 104 and renders the HTML within browser window 118 on a display of computer system.

Video window 114 comprises an area of the display where video is to be rendered. Video window 114 comprises some or all of browser window 118. Background tile 112 is applied across all of the region of browser window 118 comprised by video window 114. Note that browser window 118 and video window 114 are separate display elements, that is, they are treated as separate windows for purposes of managing the windowed display. For example, in a computer system running Microsoft Windows 2000™, browser window 118 and video window 114 comprise separate "logical windows" each with their own window handle, in manners well known in the art.

In one embodiment, browser software 102 does not apply background tile 112 to video window 114. Rather, background tile 112 is applied to the region of browser window 118 comprised by video window 114. This distinction will be described more fully below. Once the document 104 is parsed and ready to be rendered, browser 102 notifies browser helper software 108. Browser helper software 108 is software configured to operate in conjunction with browser software 102 upon the occurrence of certain events (such as the completion of parsing of an HTML file). Manners of creating and configuring browser helper software 108 for popular commercial browsers are well known in the art. Browser helper software 108 starts the video control software 110 with an indication of the location and extent of the video window. For example, in a Microsoft Windows environment a function call resembling the following might be used to start video rendering:

RunVideo(HWND hBrowserWindow, RECT *tvWindowExtent);

Here hBrowserWindow is a variable representing a software handle to the data structure (e.g. Microsoft Windows logical window) representing the browser window 118. The video control software 110 may use this window handle to configure the video window 114 and browser window 118 with a common parent window. Reasons for doing this are described in conjunction with FIG. 3 below. The variable tvWindowExtent describes a rectangular area of the display where video window 114 will be displayed. Once rendering is started, video control software 110 renders video to video window 114.

While the embodiment 100 of FIG. 1 is described in terms of HTML documents and browsers, the invention is not limited to this specific application. The invention may operate with any type of document and any software with a window onto which background video is to be rendered.

Figure 2:
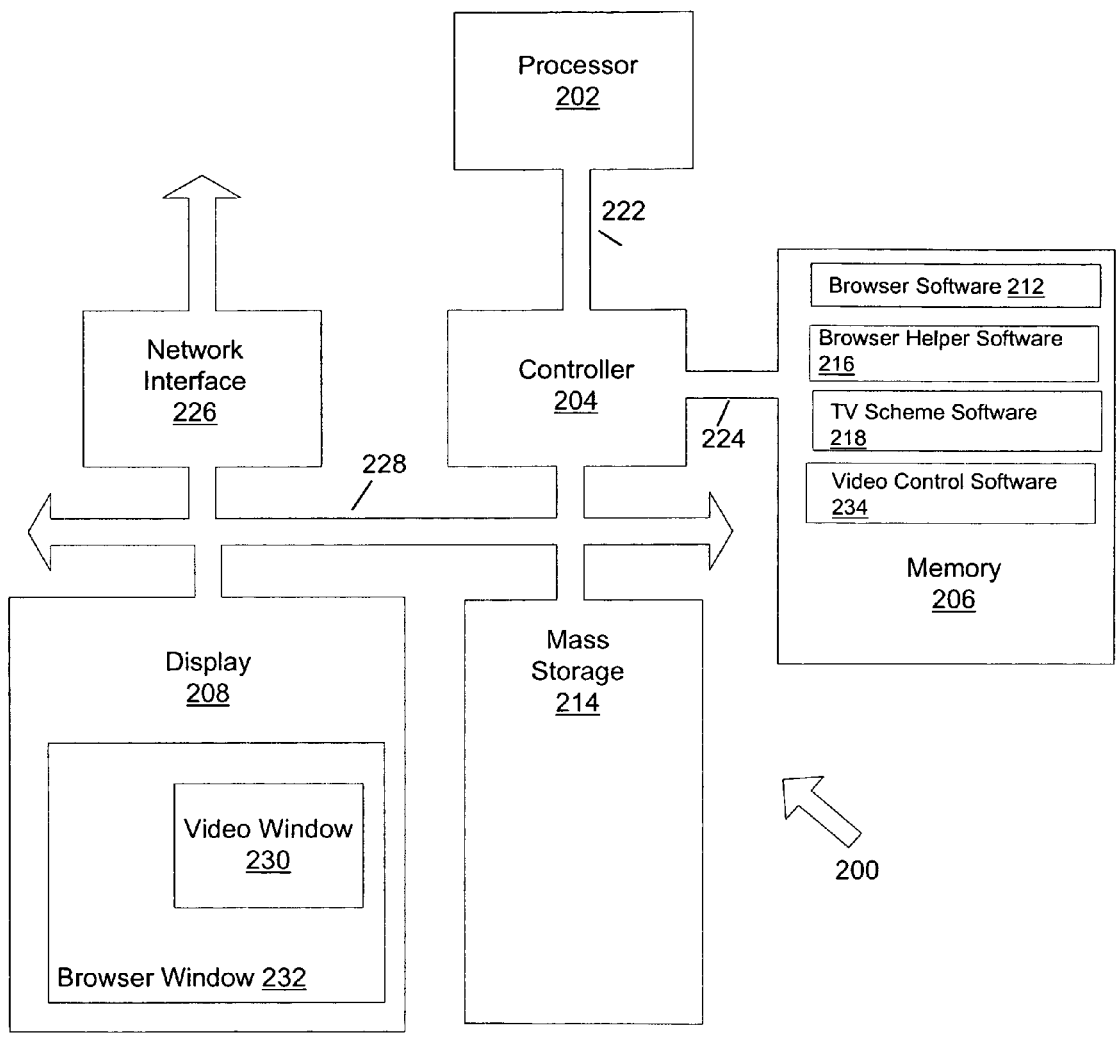
FIG. 2 shows an apparatus embodiment in accordance with the present invention.

FIG. 2 shows an apparatus embodiment 200 in accordance with the present invention. Embodiment 200 comprises a processor 202 coupled to a controller 204 by way of a processor bus 222, commonly referred to as a front side bus. Bus controller 204 is coupled to memory 206 via memory bus 224. Bus controller 204 is also coupled to various peripheral devices such as mass storage 214, network interface 226, and display 208 via I/O bus 228. Network interface 226 provides apparatus 200 with access to networks such as the Internet or corporate intranets.

Memory 206 stores browser software 212, browser helper software 316, TV scheme handler 218, and video control software 234. Memory 206 is typically a form of random access memory (RAM), although in some embodiments memory 206 could comprise non-volatile memory such as a hard disk, flash memory, or CD ROM. Memory 206 supplies the instructions of software stored therein to processor 202 for execution. Of course, mass storage 214 may store archived versions of browser software 212, browser helper software 216, TV scheme software 218, video control software 234 stored in memory 206.

Execution of browser software 212 and video control software 224 by processor 202 results in display of browser window 230 and video window 232 on display device 208.

Figure 3:
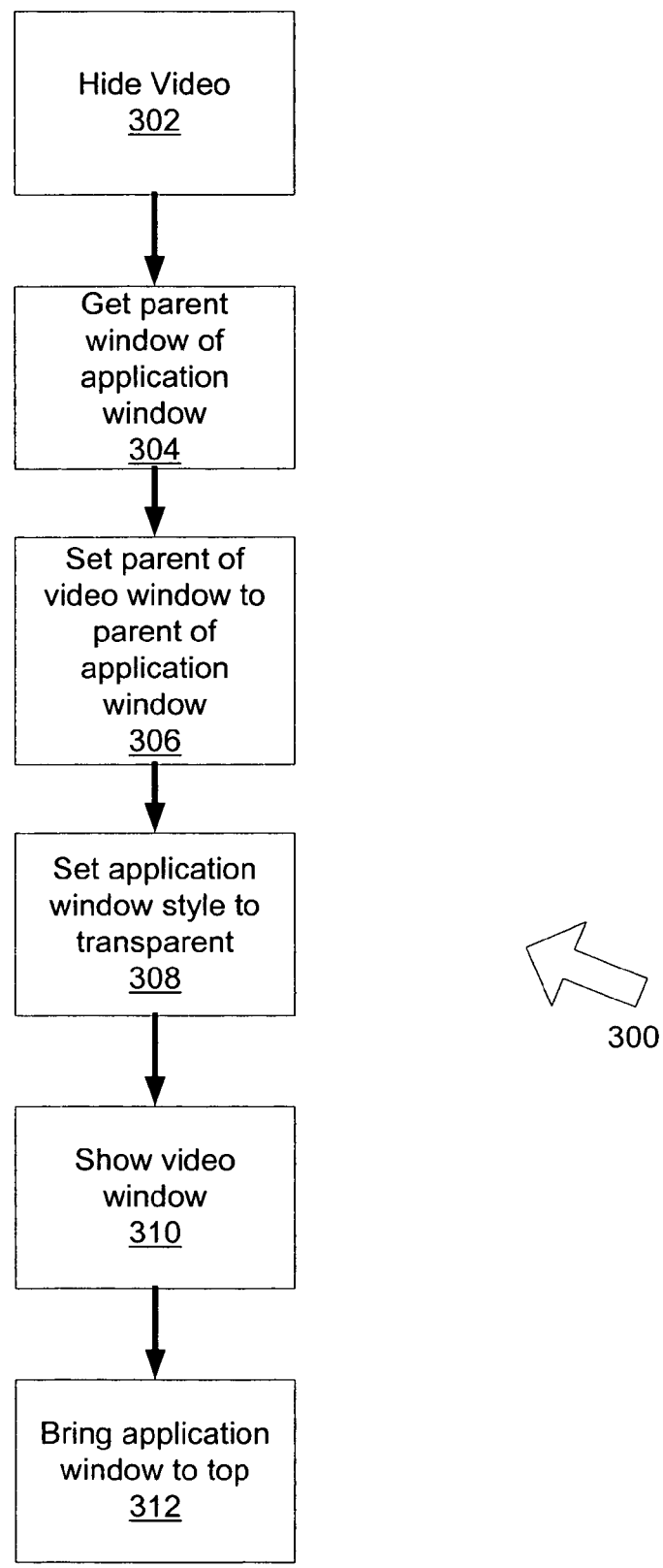
FIG. 3 shows a method embodiment in accordance with the present invention.

FIG. 3 shows a method embodiment 300 in accordance with the present invention. Embodiment 300 operates to render video in the background of a window in a windowed user interface environment. Three windows are involved; a video window, an application window, and a parent window of the application window. A parent window is a window whose position on a display device has a controlling effect on the position of child windows of the parent. Child windows are windows which have the parent window as a parent.

At 302 video window is hidden, that is, removed from the display. Video window is the window into which the video is rendered. At 304 a parent window of the application window is retrieved. In embodiment 300 the application window is a window associated with an application program, that is, some program that performs a task under the direction on a human user. Of course, the invention is in no way limited to application programs and in general applies to any software which uses windows including Java applets, component object model (COM) software, software libraries, and so on. Parent window of the video window is set to the parent window of the application window at 306. In other words, the video window is set to be a child of the same window that the application window is a child of. The parent window determines the position of child windows on the display. Whenever the parent window is moved, child windows are moved correspondingly. Setting the application window and the video window with a common parent results in the relative position of the application window and video window being maintained when one or the other is moved.

Other embodiments might not employ a common parent window for both the application and video windows. Other mechanisms may be employed to coordinate displacement of the video and application windows, so long as such mechanisms do not interfere with the order in which the windows are drawn, as described below.

At 308, the application window style is set to "transparent". This does not necessarily mean that the elements of the window, or the window itself, becomes invisible or hidden from view. Rather a "transparent" style indicates that when the application window is one of a set of child windows (e.g. siblings) on the display, the application window along with its elements are drawn last. In other words, the elements of the application window are always drawn on top of any other sibling windows with which they share an area of the display. In order for the video to render upon the background of the application window, the video window and application window overlap to some extent. The application window has a style of transparent and thus draws after the video window draws whenever the portion of the display containing the application window and video window, or a portion of them, is "invalidated". This may occur, for example, when the application and video windows are moved or when they are occluded or partially occluded by another window and later un-occluded.

To understand the effect of setting the application window style to transparent, it is helpful to examine how video is rendered in embodiment 300. A video window is established to receive the rendered video. The video window corresponds to a rectangular area of the display (other embodiments might support non-rectangular displays). This rectangular area comprises a collection of pixels, e.g. points on the display which may be illuminated with color. The pixels of the video window are first set to the chroma key color. During video rendering, each pixel within the extent of the video window region which has the chroma key color is set to the color of the video in that position. When a pixel is encountered which is not the chroma key color, that pixel is skipped and not set to the video color. The application window or a portion thereof has a background which is also set to the chroma key color. Elements of the application window which overlap the video window and which are not set to the chroma key color are not overwritten with video. For example, there may be buttons, icons, text, or other elements which are black in color, whereas the chroma key color may be cyan or magenta. These display elements will appear in the "foreground" whereas the video appears in the "background", because the video will not replace the pixels of these elements.

When a display area comprising the video and application windows or a portion thereof is invalidated, the video window or portion thereof is drawn first. In one embodiment, drawing the video window involves first setting pixels in the invalidated region with the chroma key color, and then rendering the video by setting each chroma key colored pixel to the color of the video at that pixel location. Drawing the application window involves setting each background pixel in the invalidated area to the chroma key color, and then drawing elements of the application window over this background. Thus, in one embodiment at least some pixels of the video window may be set to the chroma key color twice. Any chroma key colored pixels in the invalidated region are replaced with video. Consequently, elements of the application window which are not the chroma key color are drawn last and are not replaced with video. Video thus appears to render in the background of the application window and does not obscure the elements of the application window.

At 310 the video window is shown, that is, made visible on the display. At 312 the application window is brought to the "top" of any set of overlapping windows. In embodiment 300, bringing the application window to the top is a mechanism to make the application window responsive to user input activities such as mouse clicks and keyboard button presses. Other embodiments may of course employ other techniques to make the application window responsive.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
   creating a first window to display dynamic video content which at least partially overlaps a second window on a region of overlap on a display, wherein the first window further comprises a first non-overlap region, and the second window further comprises a second non-overlap region and at least one application element;
   setting the pixels of the first window to a chroma color;
   setting background pixels of the second window in the region of overlap to the chroma color; and
   configuring the second window to draw the at least one application element after the first window has displayed at least a portion of the dynamic video content.

2. The method of claim 1 further comprising:
   configuring the first and second windows as children of a common parent window.

3. The method of claim 1 further comprising: configuring the second window to receive user interface events.

4. The method of claim 1 in which configuring the second window to draw after the first window further comprises:
   setting the style of the second window to transparent.

5. A method comprising:
   creating a first window movable with respect to a display which at least partially overlaps a second movable window in a region of overlap on the display, wherein the first movable window further comprises a first non-overlap region, and the second movable window further comprises a second non-overlap region and at least one application element;
   configuring the first and second movable windows to move correspondingly to one another;
   configuring the first and second movable windows such that the region of overlap is drawn first with a chroma color and then with other colors representing window elements; and
   rendering dynamic video content only to areas of the region of overlap which have the chroma color.

6. The method of claim 5 further comprising:
   configuring one of the first and second movable windows to receive user interface events.

7. An article comprising:
   a memory having stored thereon instructions which, when executed by a processor, result in
   creating a first window to display dynamic video content which at least partially overlaps a second window on a region of overlap on the display, wherein the first window further comprises a first non-overlap region, and the second window further comprises a second non-overlap region and at least one application element;
   setting the pixels of the first window to a chroma color;
   setting background pixels of the second window in the region of overlap to the chroma color; and
   configuring the second window to draw the at least one application element after the first window has displayed at least a portion of the dynamic video content.

8. The article of claim 7 in which the instructions, when executed by the processor, further result in:
   configuring the first and second windows as children of a common parent window.

9. The article of claim 7 in which the instructions, when executed by the processor, further result in:
   configuring the second window to receive user interface events.

10. The article of claim 7 in which the instructions, when executed by the processor to configure the second window to draw after the first window, result in:
    setting the style of the second movable window to transparent.

11. An article comprising:
    a memory having stored thereon instructions which, when executed by a processor, result in
    creating a first window movable relative to a display which at least partially overlaps a second movable window in a region of overlap on the displays wherein the first movable window further comprises a first non-overlap region, and the second movable window further comprises a second non-overlap region and at least one application element;
    configuring the first and second movable windows to move correspondingly to one another;
    configuring the first and second movable windows such that the region of overlap is drawn first with a chroma color and then with other colors representing window elements; and
    rendering dynamic video content only to areas of the region of overlap which have the chroma color.

12. The article of claim 11 in which the instructions, when executed by the processor, further result in:
    configuring one of the first and second movable windows to receive user interface events.

13. A system comprising:
    a processor;
    a memory coupled to the processor by way of a bus, the memory having stored thereon instructions which, when executed by a processor, result in
    creating a first window movable relative to a display which at least partially overlaps a second movable window in a region of overlap on the display, wherein the first movable window further comprises a first non-overlap region, and the second movable window further comprises a second non-overlap region and at least one application element;
    configuring the first and second movable windows to have a common parent window;
    configuring the first and second movable windows such that the region of overlap is drawn first with a chroma color and then with other colors representing window elements; and rendering dynamic video content only to areas of the region of overlap which have the chroma color.

14. The system of claim 13 in which the instructions, when executed by the processor, further result in:

configuring one of the first and second movable windows to receive user interface events.

15. The system of claim 13 in which the instructions, when executed by the processor to configure the first and second movable windows such that the region of overlap is drawn first with a chroma color and then with other colors representing window elements, result in:

setting the style of one of the first and the second movable window to transparent.

* * * * *

UNITED STATES PATENT AND TRADEMARK OFFICE
CERTIFICATE OF CORRECTION

PATENT NO.     : 6,928,624 B1
DATED          : August 9, 2005
INVENTOR(S)    : Estipona It is certified that error appears in the above-identified patent and that said Letters Patent is hereby corrected as shown below:

Column 6,
Line 33, delete "displays" and insert -- display, --.

Signed and Sealed this

Eighteenth Day of October, 2005

JON W. DUDAS
*Director of the United States Patent and Trademark Office*